United States Patent
Bagaini

(10) Patent No.: US 7,272,505 B2
(45) Date of Patent: Sep. 18, 2007

(54) DETERMINATION OF GEOPHONE COUPLING

(75) Inventor: Claudio Bagaini, Milan (IT)

(73) Assignee: Westerngeco L.L.C., Houston, TX (US)

( * ) Notice: Subject to any disclaimer, the term of this patent is extended or adjusted under 35 U.S.C. 154(b) by 23 days.

(21) Appl. No.: 10/901,360

(22) Filed: Jul. 28, 2004

(65) Prior Publication Data

US 2005/0114034 A1 May 26, 2005

(30) Foreign Application Priority Data

Aug. 1, 2003 (GB) .................... 0318032.0

(51) Int. Cl.
*G01V 1/00* (2006.01)
*G01M 1/14* (2006.01)
(52) U.S. Cl. ................................... 702/14; 73/1.85
(58) Field of Classification Search ............ 702/14; 367/15, 21, 18, 37–38, 40–41, 47–49, 56–58; 73/1.85

See application file for complete search history.

(56) References Cited

U.S. PATENT DOCUMENTS

| 2,810,444 | A | | 10/1957 | Dyk et al. | |
| 4,979,150 | A | * | 12/1990 | Barr | 367/24 |
| 5,163,028 | A | | 11/1992 | Barr et al. | |
| 5,235,554 | A | * | 8/1993 | Barr et al. | 367/13 |
| 5,724,306 | A | * | 3/1998 | Barr | 367/15 |
| 5,724,307 | A | | 3/1998 | Gaiser | |
| 6,021,090 | A | * | 2/2000 | Gaiser et al. | 367/15 |
| 6,161,076 | A | * | 12/2000 | Barr et al. | 702/17 |
| 6,205,403 | B1 | * | 3/2001 | Gaiser et al. | 702/14 |
| 6,512,980 | B1 | * | 1/2003 | Barr | 702/1 |

FOREIGN PATENT DOCUMENTS

EP 0 534 648 A1 3/1993

OTHER PUBLICATIONS

Krohn, C., Geophone Ground Coupling, Jun. 1984, Geophysics, vol. 49, No. 6, pp. 722-731.*
Levin, F., The Effect of Geophone Arrays on Random Noise, Nov. 1989, Geophysics, vol. 54, No. 11, pp. 1466-1473.*

(Continued)

*Primary Examiner*—John E Barlow, Jr.
*Assistant Examiner*—Toan M. Le
(74) *Attorney, Agent, or Firm*—Steven A. Gahlings; Vincent P. Loccisano; Jody Lynn DeStefanis

(57) ABSTRACT

Information about coupling of a seismic receiver is obtained from a power spectrum for a record acquired at a seismic receiver. In one method, the power spectrum for the record is compared with a reference power spectrum, which may be known a priori or which may be determined from the power spectra of records acquired by a group of receivers. In an alternative method, one receiver of a group of receivers is designated as a reference receiver, and the power spectra of records acquired by other receivers in the group are compared with a power spectrum for the reference receiver. The obtained information about the coupling of a receiver may be used to determine a coupling correction operator for the receiver, and this operator can be applied to seismic data acquired by the receiver to correct for the effects of imperfect coupling of the receiver.

16 Claims, 9 Drawing Sheets

OTHER PUBLICATIONS

Bard, P.-Y. (1999). Microtremor measurements: A tool for site effect estimation? In. Irikura, K., Kudo, K., Okada, H. and Sasatani, T. (Eds.) (1999). Proceed. 2nd Intern. Symp. on the effects of surface geology on seismic motion. Yokohama, Japan, Dec. 1-3, 1998, Balkema, Rotterdam/Brookfield, 1251-1279.

Drijkoningen, G .G., 2000, The usefulness of geophone ground-coupling experiments to seismic data: Geophysics, Soc. of Expl. Geophys., 65, 1780-1787.

Krohn, C. E., 1984, Geophone ground coupling: Geophysics, Soc. of Expl. Geophys., 49, 722-731.

Lachet, C., and Bard, P.-Y. (1994). Numerical and theoretical investigations on the possibilities and limitations of the "Nakamura's" technique. J. Physics of the Earth, 42, 377-397.

Nakamura, Y. (1989). A method for dynamic characteristics estimation of subsurface using microtremor on the ground surface. Quarterly Report of RTRI, 30, 25-33.

Washburn, H. and Wiley, H., 1941, The effect of the placement of a seismometer on its response characteristics: Geophysics, Soc. of Expl. Geophys., 06, 116-131.

Wolf, A., 1944, The equation of motion of a geophone on the surface of an elastic earth: Geophysics, Soc. of Expl. Geophys., 09, 29-35.

Hoover, G. M. and O'Brien, J. T., 1980, The influence of the planted geophone on seismic land data: Geophysics, Soc. of Expl. Geophys., 45, 1239-1253.

Pavlis, G. L., and Vernon, F., L., 1994, Calibration of Seismometers using ground noise: Bulletin of the Seismological Society of America, 84, 1243-1255.

* cited by examiner

DETERMINATION OF GEOPHONE COUPLING

FIELD OF THE INVENTION

The present invention relates to a method of obtaining information about the coupling between a receiver and the earth, in particular about coupling between a geophone and the earth.

BACKGROUND OF THE INVENTION

In a seismic survey a source is actuated to generate seismic energy, and the resultant seismic wavefield is sampled by an array of seismic receivers spaced from the seismic source. Each receiver acquires seismic data, which are normally in the form of a record or "trace" representing the value of some characteristic of the seismic wavefield against time. The acquired seismic data are a representation of the seismic wavefield at the receiver location. Information about the earth's sub-surface can be obtained from the acquired seismic data.

One well-known type of seismic receiver is the seismic geophone. A geophone contains one or more sensors mounted in a casing. A geophone may be single component geophone, which contains one sensor that records the component of the seismic wavefield parallel to a pre-determined direction. Information about the vertical component of the seismic wavefield, for example, may be obtained using a single component geophone oriented such that the sensing direction of the geophone is substantially vertical. Alternatively, a geophone may be a three-component geophone which contains three sensors oriented so as to record the components of the seismic wavefield in three orthogonal directions (normally denoted as the geophone's x-, y- and z-axes).

A geophone may be deployed simply by placing the geophone casing on the earth's surface. This may be done in land-based surveys or in marine surveys where geophones are deployed on the sea-floor. Alternatively, geophones in which the casing is provided with a spike are known, and these are deployed by driving the spike into the earth's surface. Spiked geophones are generally limited to use in land-based surveys.

In order accurately to measure the seismic wavefield, a geophone must be well coupled to the Earth's surface. The output from a geophone is the seismic wavefield convolved by the transfer function between the ground and the geophone. The transfer function represents what is commonly called the "coupling" of the geophone. If the coupling between the geophone and the ground is perfect, the transfer function is equal to one for all frequencies and the output signal is a good representation of the seismic wavefield. If the transfer function is not equal to unity for all frequencies of interest, however, then the output signal from the geophone is a distorted representation of the seismic wavefield. Where a multi-component geophone is used, there will be a separate transfer function for each component of the seismic wavefield that is sensed by the geophone or, if mutual effects are not negligible, a multi-channel transfer function.

Acknowledgement of the Prior Art

The study of geophone transfer function has formed the subject of several publications. It has been recognised for some time that the motion of a geophone case resting on the Earth's surface is not the same as the motion of the earth that would occur in the absence of the geophone case. The coupling between a geophone and the earth was investigated by Washburn, H. and Wiley, H. in "The effect of the placement of a seismometer on its response characteristics", Geophysics, Soc. of Expl. Geophys., 06, 116-131 (1941) and by Wolf, A. in "The equation of motion of a geophone on the surface of an elastic earth", Geophysics, Soc. of Expl. Geophys., 09, 29-35 (1944). However, these classical theoretical works are based upon a model of a geophone with a flat base resting on the Earth's surface, and this would be expected to have different coupling to the ground from the nowadays commonly used spiked geophone.

Drijkoningen, G. G. has reported, in "The usefulness of geophone ground-coupling experiments to seismic data", Geophysics, Soc. of Expl. Geophys., 65, 1780-1787 (2000), field experiments on geophone coupling and has proposed a two-state system to explain the phenomena that occur with planted spike geophones: spike coupling and gravitational coupling. These two states correspond respectively to a firmly planted geophone and to a geophone resting on its base. In the first state, the coupling resonance frequency is (at least for vertical component geophones) beyond the seismic bandwidth, but in the second case (of gravitational coupling) the coupling resonance frequency may, depending on the soil firmness, be within the seismic bandwidth and therefore affect the amplitude and phase of the signal recorded by the geophone. In this case the signal recorded by the geophone is no longer proportional to the ground particle velocity. (The term "coupling resonance frequency" denotes the frequency at which a resonance, arising as a result of the geophone coupling, occurs in the transfer function). Gravitational coupling is the mechanism upon which most of the seabed seismic acquisitions are based, but it is undesired in a land-based seismic survey where spike coupling is expected to be the dominant mechanism.

Krohn, C. E. has reported, in "Geophone ground coupling", Geophysics, Soc. of Expl. Geophys., 49, 722-731, (1984), laboratory and controlled small scale field experiments leading to the conclusion that good planting of modern vertical component sensing geophones having spikes up to 5 inches long is acceptable for conventional seismic surveys using frequencies up to 100 Hz and in which the particle velocities at the geophone are less than $10^{-2}$ cm/s. However, in commercial size acquisitions, the quality of geophone planting cannot be guaranteed throughout the surveyed area, and it is also possible for a well-planted geophone to be disturbed after planting. Moreover, in sand-covered areas geophones without spikes are often used, buried a few centimetres below the surface. A simple method of detecting bad coupling conditions is highly desirable, as this would allow data acquired by a badly-coupled geophone to be corrected to compensate for the bad coupling.

When a multi-component geophone is deployed, coupling between the geophone and one component of the seismic wavefield may be better than the coupling between the geophone and another component of the seismic wavefield. U.S. Pat. No. 5,724,307 proposes a method for determining a filter that corrects for imperfect coupling of a geophone to the cross-line component of the seismic wavefield on the assumption that the geophone is perfectly coupled to the in-line component of the seismic wavefield.

However, this method will give good results only if the geophone is well coupled to the in-line component of the seismic wavefield.

U.S. Pat. No. 5,724,306 proposes a method for determining a filter that corrects for imperfect coupling of a geophone to a component of the seismic wavefield. This method is applicable to a seismic receiver that contains a geophone and a hydrophone, and is based on the assumption that the hydrophone is perfectly coupled. This method cannot, however, be applied to a receiver that does not contain a hydrophone and so cannot be used in a land-based seismic survey.

SUMMARY OF THE INVENTION

A first aspect of the present invention provides a method of obtaining information about coupling of a seismic receiver, the method comprising: determining a power spectrum for a record acquired at a seismic receiver, and obtaining information about the receiver coupling from the power spectrum. (The term "record" generally denotes a record of the value of some characteristic of the seismic wavefield against time, and is intended to cover a record in, for example, the form of numerical values stored in a memory medium, in the form of a visual display or "trace" showing the characteristic against time, etc.). It is known to use power spectra to identify a site-specific response in earthquake seismology, but this prior technique assumes that variations in the response of the earth-sensor coupling are negligible between sensors (and this assumption is accurate for sensors used in earthquake seismology).

The method may comprise comparing the determined power spectrum to a reference power spectrum. Where an a priori reference power spectrum is available for the receiver location the determined power spectrum may be compared with the a priori reference power spectrum, and this provides a simple way of obtaining information about the receiver coupling.

If no a priori reference power spectrum is available, the method may comprise estimating a reference power spectrum from the acquired records. For example, the receiver may be one of a group of seismic receivers, and the method may comprise determining a reference power spectrum for the group of seismic receivers. The reference power spectrum may then be used to obtain information about the coupling of each receiver in the group.

The reference power spectrum may be obtained from the power spectra of every record (trace) acquired by every receiver in the group. This has the potential disadvantage, however, that the estimated reference power spectrum may not be fully representative of a well-coupled geophone if one or more of the receivers in the group is/are not well-coupled. In a preferred embodiment of the invention, therefore the reference power spectrum is determined from the power spectra of selected signals acquired by receivers of the group.

The method may alternatively comprise: determining a first power spectrum for a first record acquired at a first seismic receiver; determining a second power spectrum for a second record acquired at a second seismic receiver spatially separated from the first seismic receiver, the second record being acquired substantially simultaneously with the first signal; and obtaining information about the coupling of one of the receivers from the first and second power spectra.

The method may comprise: identifying one of the first and second receivers as a reference receiver from the first and second power spectra. It may comprise obtaining information about the coupling of the other of the first and second receivers relative to the coupling of the reference receiver.

The or each record may be a noise record. In a seismic survey, a noise record is obtained as soon as the receivers are made active. Use of the noise record therefore allows coupling information to be obtained before the seismic source is actuated. Signals that, in the case of an impulsive or continuous source, arrive at a receiver after actuation of the seismic source but before the first arrival of seismic energy from the source will also be referred to as "noise". The record is not, however, limited to a noise record and may be a record of the reflected seismic signal itself.

A second aspect of the present invention provides a method of obtaining information about coupling of a seismic receiver, the method comprising acquiring a noise record using a seismic receiver, and obtaining information about the receiver coupling from the acquired noise record. Again, the term "noise" as used herein denotes the portion of the record acquired at a receiver before the first arrival at the receiver of seismic energy emitted by the source. The above-mentioned technique for identifying a site-specific response in earthquake seismology may use ambient noise but, as described above, this prior method does not investigate the coupling of individual sensors.

The obtained coupling information may comprise a resonance coupling frequency and/or a coupling damping coefficient.

The information about the receiver coupling may be taken into account during processing of seismic data acquired at the receiver. For example, the method may further comprise the step of determining a coupling correction operator from the obtained coupling information. The present invention makes it possible to obtain, for example, the resonance coupling frequency and the coupling damping coefficient needed for derivation of a coupling correction operator that correct seismic data acquired at a receiver for the effect of imperfect coupling of the receiver. This may be done according to the model of Washburn and Wiley (above).

The method may comprise applying the coupling correction operator during processing of the seismic data. A coupling correction operator would be determined for a particular receiver and would be applied during processing of the seismic data acquired by that receiver. In a practical seismic survey a respective coupling correction operator may be determined for each receiver (except for a reference receiver, in an embodiment that uses a reference receiver) and the coupling correction operators would be applied during processing of the seismic data in a receiver-consistent manner.

Applying the coupling correction operator compensates the seismic data for the effects of the poor receiver coupling, and provides an estimate of the data that would have been acquired if the receiver had been perfectly coupled.

A third aspect of the present invention provides an apparatus for obtaining information about coupling of a seismic receiver, the apparatus comprising: means for determining a power spectrum for a record acquired at a seismic receiver; and means for obtaining information about the receiver coupling from the power spectrum.

A fourth aspect of the present invention provides an apparatus for obtaining information about coupling of a seismic receiver, the apparatus comprising: means for acquiring a noise record using a seismic receiver; and means for obtaining information about the receiver coupling from the acquired noise record.

The apparatus may comprise a programmable data processor.

A fifth aspect of the present invention provides a storage medium containing a program for the data processor of an apparatus of the third or fourth aspect.

A sixth aspect of the present invention provides a storage medium containing a program for controlling a programmable data processor to carry out a method of the first or second aspect.

A seventh aspect of the present invention provides a program for controlling a computer to carry out a method of the first or second aspect.

The invention provides a quick and accurate method of checking whether the receivers in a receiver group are consistently-coupled. It will identify any receivers that are not well-coupled and, in a land based survey, allows survey personnel to replant any receiver that is found not to be well-coupled. Where replanting receivers is not possible, the invention allows the effects of poor coupling to be attenuated during processing of acquired seismic data. The invention may be employed in a land-based seismic survey or in a marine seismic survey in which the receivers are disposed on the seafloor.

BRIEF DESCRIPTION OF THE DRAWINGS

Preferred embodiments of the present invention will be described by way of illustrative example with reference to the accompanying figures in which:

FIG. 2(*b*) is a block flow diagram of another method of the present invention;

FIG. 7(*c*) shows the traces of FIG. 7(*b*) after processing by a method of the invention.

DETAILED DESCRIPTION OF PREFERRED EMBODIMENTS

Figure 1:
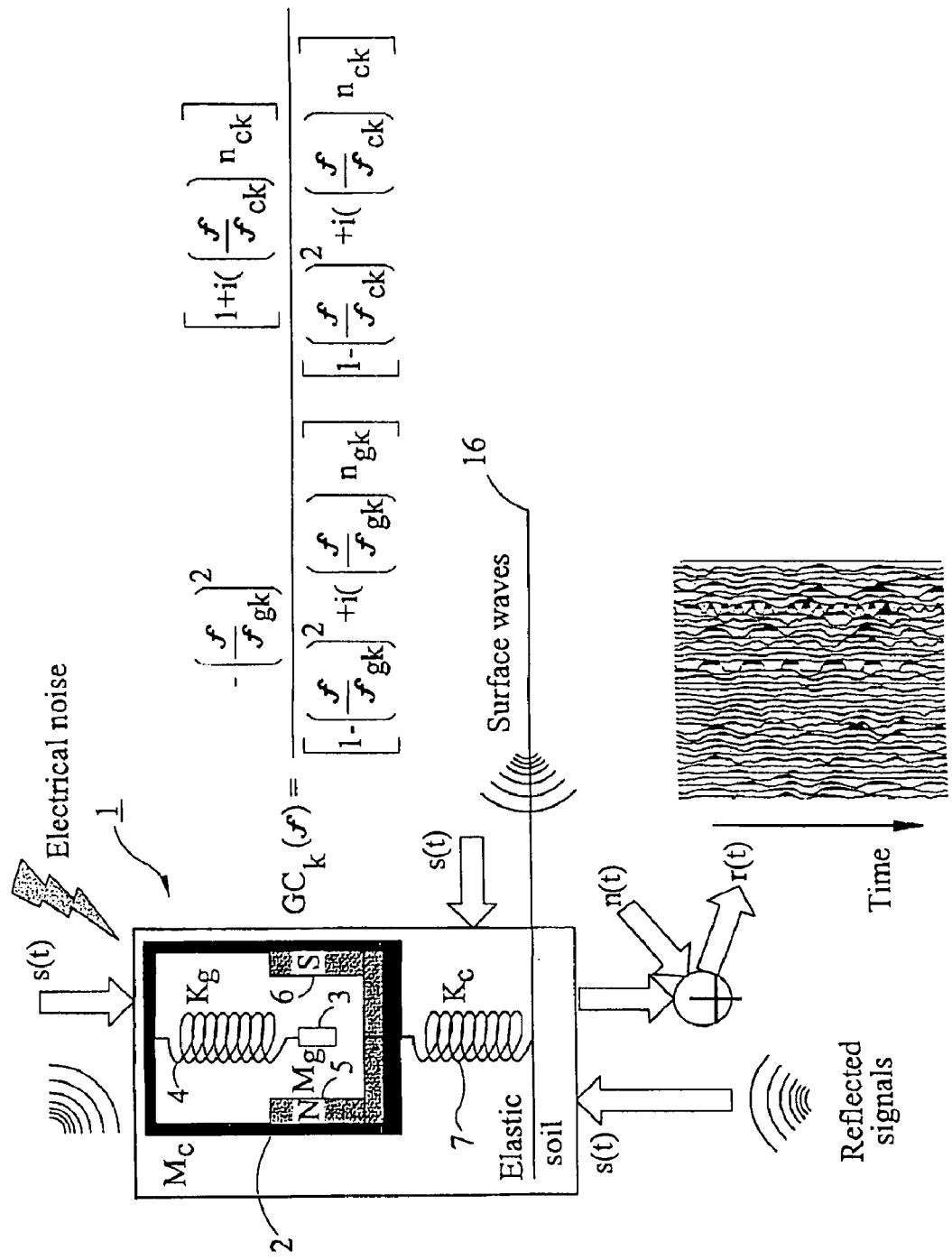
FIG. 1 illustrates a model of a geophone and also shows the geophone-ground coupling model.

FIG. 1 is a diagrammatic view of a geophone 1. As shown in the figure, the geophone 1 comprises a casing 2. A geophone coil 3 of mass $m_g$ is suspended within the casing by a spring 4. Magnets 5,6 are disposed near the coil 3, so that movement of the coil leads to generation of an electrical current. Movements of the coil 3 are, in practice, damped, and this may be represented by a damping coefficient $\eta_g$. The geophone coil thus acts, in this model, as a classical damped harmonic oscillator.

FIG. 1 also illustrates the coupling of the geophone casing to the earth. This coupling is modelled again as a damped harmonic oscillator, and is indicated by a second spring, the "coupling spring" 7, which connects the geophone casing 2 to the earth's surface 16. Damping of the coupling spring is represented by a damping coefficient $\eta_c$. The overall mass of the geophone casing 2 and its contents is denoted by $m_c$.

A transfer function for the geophone model of FIG. 1 has been derived by Krohn (above). The transfer function here reported is, for the $k^{th}$ geophone:

$$GC_k(f) = \frac{-\left(\frac{f}{f_{g_k}}\right)^2 \left[1 + i\left(\frac{f}{f_{c_k}}\right)\eta_{c_k}\right]}{\left[1 - \left(\frac{f}{f_{g_k}}\right)^2 + i\left(\frac{f}{f_{g_k}}\right)\eta_{g_k}\right]\left[1 - \left(\frac{f}{f_{c_k}}\right)^2 + i\left(\frac{f}{f_{c_k}}\right)\eta_{c_k}\right]} \quad (1)$$

where $f_{g_k}$ is the resonance frequency of the $k^{th}$ geophone, $f_{c_k}$ is the coupling resonance frequency for the $k^{th}$ geophone, and $f$ is the frequency of the seismic wavefield.

FIG. 1 also illustrates the output from the $k^{th}$ geophone, which is denoted by $r_k(t)$. There are two contributions to the output. The first component arises from inputs to the geophone arising from reflected seismic energy incident on the geophone, surface waves incident on the geophone, and ambient noise. Typical causes of external noise include, for example: vibrations caused by human or animal activity, wind, electromagnetic fields due to power lines and to recording equipment, thunderstorms, earth ground systems, cathodic protection of pipelines, charged fences, shot blasters and radios. Internal noise also arises in the geophone owing to two causes: as a result of coil resistance and as a result of Brownian (random) particle movement. The input to the $k^{th}$ geophone from these sources is denoted collectively by $s_k(t)$. This input is filtered by the geophone-ground coupling, and so produces an output from the $k^{th}$ geophone of:

$$s_k'(t) = GC_k s_k(t) \quad (2)$$

The second contribution to the geophone output is noise that is not filtered by the geophone-ground coupling such as, for example, electronic noise owing to the electrical circuitry that processes the geophone output electrical signal. This noise for the $k^{th}$ geophone is denoted collectively as $n_k(t)$.

Thus, the overall output from the $k^{th}$ geophone, $r_k(t)$, is given by:

$$r_k(t) = s_k'(t) = GC_k s_k(t) + n_k(t) \quad (3)$$

Consider a seismic surveying arrangement comprising two geophones. If the differences in sensor characteristics (sensitivity, resonance frequency and damping) between the two geophones are negligible, as will be assumed here, the ratio of the transfer function for one geophone to the transfer function of the other geophone contains exclusively terms due to the coupling mechanism, namely:

$$\frac{GC_2(f)}{GC_1(f)} = \frac{1 + i(f/f_{c2})\eta_{c2}}{1 + i(f/f_{c1})\eta_{c1}} \frac{1 - (f/f_{c1})^2 + i(f/f_{c1})\eta_{c1}}{1 - (f/f_{c2})^2 + i(f/f_{c2})\eta_{c2}} \quad (4)$$

where subscripts 1 and 2 denote respectively the first and second geophones.

If the electronic noise n(t) is negligible, and if the signals $s_1(t)$, $s_2(t)$ input to the two geophones have equal power spectra, even though their phases may be different, then the ratio of the power spectrum of the signal output by one geophone to the power spectrum of the signal output by the other geophone is given by:

$$P_{tr}(f) = \frac{|GC_2(f)|^2}{|GC_1(f)|^2} \quad (5)$$

The assumption that the signals recorded at the two sensors have the same power spectra can be verified, as is described below.

However $P_{tr}(f)$ is not known and must be estimated.

In a typical seismic survey, a seismic source is actuated and the seismic wavefield is sampled and recorded at several receivers located at different locations. Each receiver records a trace of at least one characteristic of the wavefield as a function of time. An actuation of a seismic source is known as a "shot", and the set of traces recorded at the various receivers for one shot is known as a "shot gather". Several shots are fired during a seismic survey, making available a collection of several observations (traces) for each receiver. A typical set of traces acquired by a single receiver is shown in FIG. 1; each trace corresponds to a different shot.

A possible estimate of $P_{tr}(f)$ (omitting now on the dependence on the frequency) is:

$$\hat{P}_{tr}^{(1)} = \frac{\sum_{is} \hat{P}_{r2,is}}{\sum_{is} \hat{P}_{r1,is}} \quad (6)$$

where $\hat{P}_{r1,is}$ is the estimate of the power spectra obtained from the trace acquired by the first receiver from shot is and $\hat{P}_{r2,is}$ is the estimate of the power spectra obtained from the trace acquired by the second receiver from shot is. An alternative estimate of the spectral ratio is:

$$\ln \hat{P}_{tr}^{(2)} = \frac{1}{ns} \sum_{is} \left( \ln \hat{P}_{r2,is} - \ln \hat{P}_{r1,is} \right) \quad (7)$$

which is the least squares solution of the over-determined system of linear equations:

$$\ln \hat{P}_{tr}^{(2)} = \ln \hat{P}_{r2,is} - \ln \hat{P}_{r1,is}, \ is=1\ldots ns. \quad (8)$$

where is denotes the $i^{th}$ shot, and goes from 1 to ns (i.e., a total of n shots). An anomalously energetic event recorded by both sensors, which is often quasi-monochromatic, does not affect the second estimator of equation (7), while it dominates the result of the first estimator of equation (6). In other words, stationarity of the power spectrum is not a required condition for $\hat{P}_{tr}^{(2)}$. However, the second estimator suffers from the presence of notches in the estimated power spectra.

The estimator $\hat{P}_{tr}^{(2)}$ can be used to verify the assumption that the input signals at neighboring sensors have equal power spectra and that the differences between signals recorded at different sensors arise from a time-invariant phenomenon such as differences in coupling between sensors. The residuals of the least square solution of equation (8) are in fact an indicator of validity of this assumption. An iteratively re-weighted least-square solution using a diagonal weighting matrix whose elements are inversely proportional to the residuals can be used to reduce the effects of inconsistent measurements.

Equations (2) and (5) can be used to derive $f_{c2}$ and $\eta_{c2}$, assuming that receiver 1 is perfectly coupled to the seismic wavefield, through the following non-linear minimisation procedure where the dependence on the sampled frequencies $(f_j)$ is now explicit:

$$\min_{f_{c2},\eta_{c2}} \sum_{f_j} \left( \sqrt{\hat{P}_{tr}^{(2)}(f_j)} - \left| \frac{1 + i(f_j/f_{c2})\eta_{c2}}{1 + i(f_j/f_{c1})\eta_{c1}} \frac{1 - (f_j/f_{c1})^2 + i(f_j/f_{c1})\eta_{c1}}{1 - (f_j/f_{c2})^2 + i(f_j/f_{c2})\eta_{c2}} \right| \right)^2 \quad (9)$$

Thus, by determining that one receiver is a "perfectly coupled" receiver, as described below, it is possible to obtain information about the coupling of the second receiver. The "perfectly-coupled" receiver is used as a reference receiver. This procedure may also be applied to a seismic surveying arrangement having more than two receivers—by again determining that one receiver is perfectly coupled to the seismic wavefield, it is possible to obtain information about the coupling of other receivers in the seismic surveying arrangement.

The determination of the perfectly-coupled, or best coupled, receiver in the group of neighboring receivers takes into account two well known properties of the coupling mechanism: it emphasises frequencies near the coupling resonance frequency, and introduces a phase delay. If it is initially assumed that receiver 2 is the reference receiver, but when $\hat{P}_{tr}^{(2)}$ is calculated it has a trough rather than a peak in the region of the expected coupling resonance frequency, this indicates that receiver 2 is better coupled than receiver 1 and so receiver 2 becomes the reference receiver. In the case that both receivers are properly coupled $\hat{P}_{tr}^{(2)}$ is, as will be shown below, approximately flat and the minimisation algorithm finds a large coupling resonance frequency (that is, the coupling resonance frequency is well outside the seismic bandwidth) and small damping factor, which is the mathematical expression of perfect coupling conditions.

Thus, by determining the best-coupled receiver in a group of closely-spaced receivers, it is possible to obtain information about the coupling of all other receivers in the group. The maximum distance between receivers over which the method may be applied can be determined from the over-determined system of linear equations (8), by noticing when extending the area under analysis—that is, adding equations to the system—leads to the residuals exceeding a pre-set value.

In an alternative embodiment, if a reference power spectrum of the recorded signal in the area is available or can be estimated then this may be used to obtain information about the coupling of all receivers in the seismic surveying arrangement rather than assuming that one receiver is perfectly coupled. Information about the coupling of a receiver may be found by comparing the power spectrum of traces acquired by the receiver with the reference power spectrum, and this process may be carried out for any desired receiver.

Figure 2A:
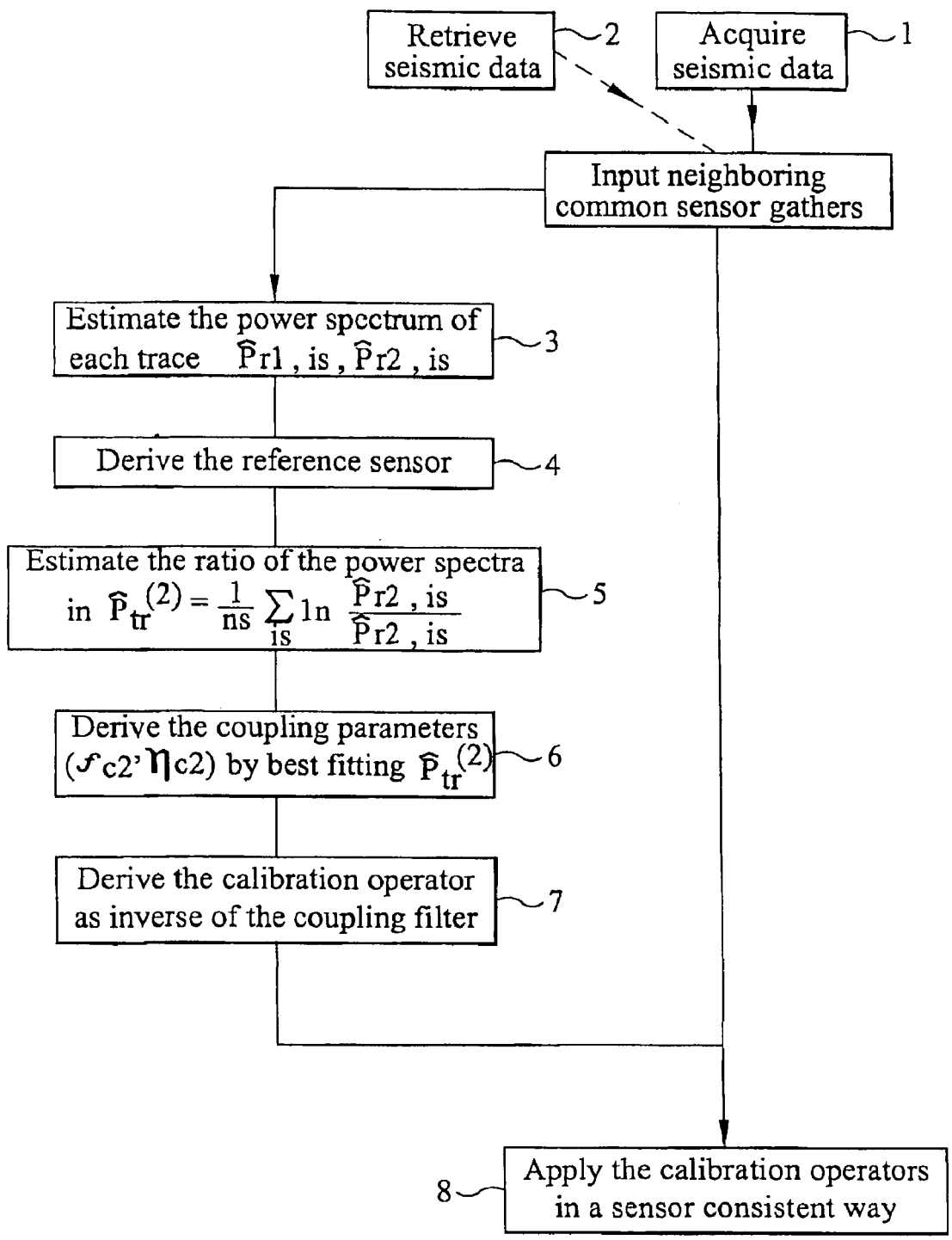
FIG. 2(*a*) is a block flow diagram of a method of the present invention.

FIG. 2(a) is a block flow diagram of one method of the present invention. For simplicity, FIG. 2(a) illustrates a method for a case where there are only two receivers. Initially at step 1 a plurality of seismic data traces is acquired at receiver 1, and a plurality of seismic data traces are simultaneously acquired at receiver 2. Receiver 1 is spatially separated from receiver 2, and both receivers are of the same type and so have nominally identical sensor characteristics. The receivers may be geophones. The invention may alternatively be applied to pre-existing seismic data traces, and in this case step 1 is replaced by the step, step 2, of retrieving pre-existing data traces from storage. Step 1 or step 2 provides a gather of traces for each receiver.

At step 3, the power spectrum $\hat{P}_{r1,is}$ of each trace acquired by the receiver 1 is determined, and the power spectrum of each trace acquired by receiver 2 is also determined. The power spectra of the traces may be estimated in any suitable way. For example, a reliable estimate of the power spectra may be obtained using either an auto-regressive approach (such as the approach of Burg, of typically $16^{th}$ order) or a periodogram.

In a preferred aspect of the invention, the power spectra are determined from at least the noise portion of the seismic data traces—that is, from the portion of the seismic data traces before the first arrival of seismic energy from the source. Indeed, the power spectra may be determined from only the noise portion of the seismic data traces, since large quantities of data relating to ambient noise are available in a typical seismic survey before any seismic source is actuated.

At step 4, the reference receiver is determined. This may be done by, for example, determining $\hat{P}_{tr}^{(2)}$ according to equation (8); if $\hat{P}_{tr}^{(2)}$ has a trough rather than a peak in the vicinity of the expected resonance coupling frequency, receiver 2 is better coupled than receiver 1 and so is selected as the reference receiver. (For a given type of receiver, the expected coupling resonance frequency depends primarily on the elastic properties of the soil at the receiver location.)

At step 5, the ratio of the power spectra of the two receivers is estimated by applying equation (7) to all traces available.

At step 6, information about the coupling of the receiver that was not identified as the reference receiver at step 4 is obtained. Thus, if the receiver 1 is identified as the reference receiver at step 4, step 6 obtains information about the coupling of receiver 2, on the assumption that receiver 1 is well-coupled to the wavefield. In a preferred embodiment, step 6 determines the coupling resonance frequency and/or the coupling damping coefficient for the receiver that was not identified as the reference receiver at step 4, using equation (9) and the value of $\hat{P}_{tr}^{(2)}$ determined at step 5.

At step 7, a coupling correction operator such as, for example, a calibration filter for the receiver not identified as the reference receiver may be determined from the coupling parameters of the receiver determined at step 6. The calibration filter may be considered as the inverse of the receiver transfer function and will correct for the imperfect coupling of the receiver—applying the calibration filter to data acquired at the receiver will compensate for the imperfect receiver coupling and will yield the data that would have been acquired if the receiver had been perfectly coupled.

Once the coupling correction operator for the receiver not identified as the reference receiver has been determined, it may be applied to seismic data traces acquired at that receiver to correct for the imperfect coupling of the receiver, and this is shown as step 8. As is shown below, the coupling correction operator for a particular receiver is consistent for all data traces acquired by that receiver in a particular survey (assuming that the receiver is not moved or disturbed).

Once data acquired at a receiver has been corrected for the imperfect receiver coupling by applying the coupling correction operator at step 8, the data may undergo further processing steps (not shown). For example, the data may be combined with data from one or more other receivers. Additionally or alternatively, the calibrated data may be processed to obtain information about the structure of the earth's interior.

An alternative embodiment of the invention may be used where a reference power spectrum for the survey location is available or can be estimated. This is shown in FIG. 2(*b*). In this embodiment, information about the coupling of a receiver is obtained by comparing the reference power spectrum with a power spectrum estimated from data acquired by the receiver.

In this embodiment, it may be the case that an a priori reference power spectrum is available for the survey location. For example, a reference power spectrum of the ambient noise at the survey location may be available and, if so, step 3 would consist of determining ambient noise power spectra from one or more traces acquired by a receiver. These may then be compared directly with the reference ambient noise power spectrum. Step 4 in this embodiment comprises retrieving the reference power spectrum. It is not necessary to identify one receiver as a reference receiver.

Step 5 consists of determining $\hat{P}_{tr}^{(2)}$ from the ratio of the power spectra determined for the receiver in step 3 to the reference ambient noise power spectrum. This may be done using equation (10):

$$\ln \hat{P}_{tr}^{(2)} = \frac{1}{ns}\sum_{is} \ln \hat{P}_{r2,is} - \hat{P}_{ref} \qquad (10)$$

Equation (10) corresponds generally to equation (7), but assumes that a reference power spectrum $\hat{P}_{ref}$ is available.

Steps 3, 4 and 5 may be repeated for each receiver in a receiver array.

Steps 6, 7 and 8 in this embodiment would be generally similar to the steps 6, 7 and 8 described above.

In an alternative embodiment a reference power spectrum for the survey location is not known a priori but is estimated from the traces acquired by the receivers. In this embodiment, step 4 of FIG. 2(*b*) comprises estimating a reference power spectrum. The reference power spectrum may, for example, be determined by simply averaging the power spectra of every available trace for each receiver (that is, averaging all the power spectra determined at step 3).

Alternatively, the reference power spectrum may be estimated by averaging the power spectra of traces that do not have a peak in the vicinity of the expected coupling resonance frequency. A peak in the vicinity of the expected coupling resonance frequency in a power spectrum is suggestive of bad coupling, so avoiding using such traces in the estimation of the reference power spectrum should provide a more accurate estimate of the reference power spectrum. In this embodiment, therefore, step 4 of FIG. 2(*b*) would comprise, for each trace, determining whether the power spectrum of that trace had a peak in the vicinity of the expected coupling resonance frequency, discarding traces with such a peak in the power spectrum, and averaging the remaining traces to estimate the reference power spectrum.

In the method of FIG. 2(*b*), the ideal coupling resonance frequency and the coupling damping coefficient are set such that the transfer function in ideal coupling conditions is maximally flat in the seismic bandwidth. To obtain these conditions, the coupling resonance frequency is set much larger than the seismic bandwidth. For large values of the coupling resonance frequency, the transfer function is not affected by the value of the damping.

The methods of FIGS. 2(*a*) and 2(*b*) have been described with reference to a single component receiver. The invention may however be applied to a multi-component receiver. Essentially, the method of FIG. 2(*a*) or 2(*b*) would be applied separately to the each component of the wavefield sampled by the multi-component receiver. In the case of, for example, a three-component geophone, the method of the invention would be applied separately to the x-, y- and z-component data acquired by the geophone.

Figure 2B:
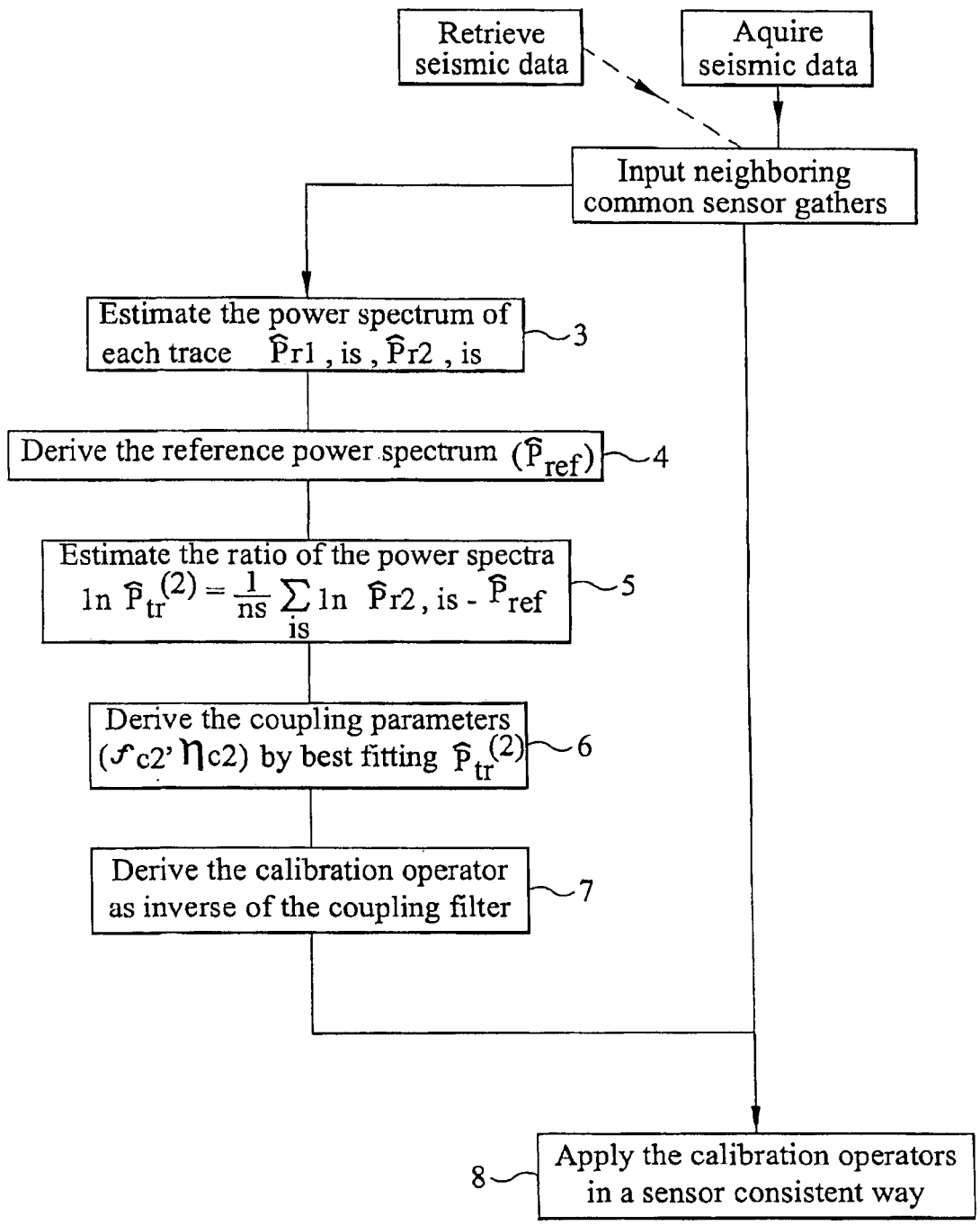

The methods of FIGS. 2(a) and 2(b) have been described with reference to a group of two receivers, for ease of description. The invention is not, however, limited to a group of two receivers and may be applied to a group of more than two receivers. For example, if the method of FIG. 2(a) were applied to a group of more than two receivers, step 2 would be carried out for each receiver. The reference receiver would then be determined. Steps 5, 6 and 7 would then be carried out for each receiver, to determine a calibration operator for each receiver. Finally, each calibration filter is applied to data acquired at the respective receiver at step 8.

Figure 3A:
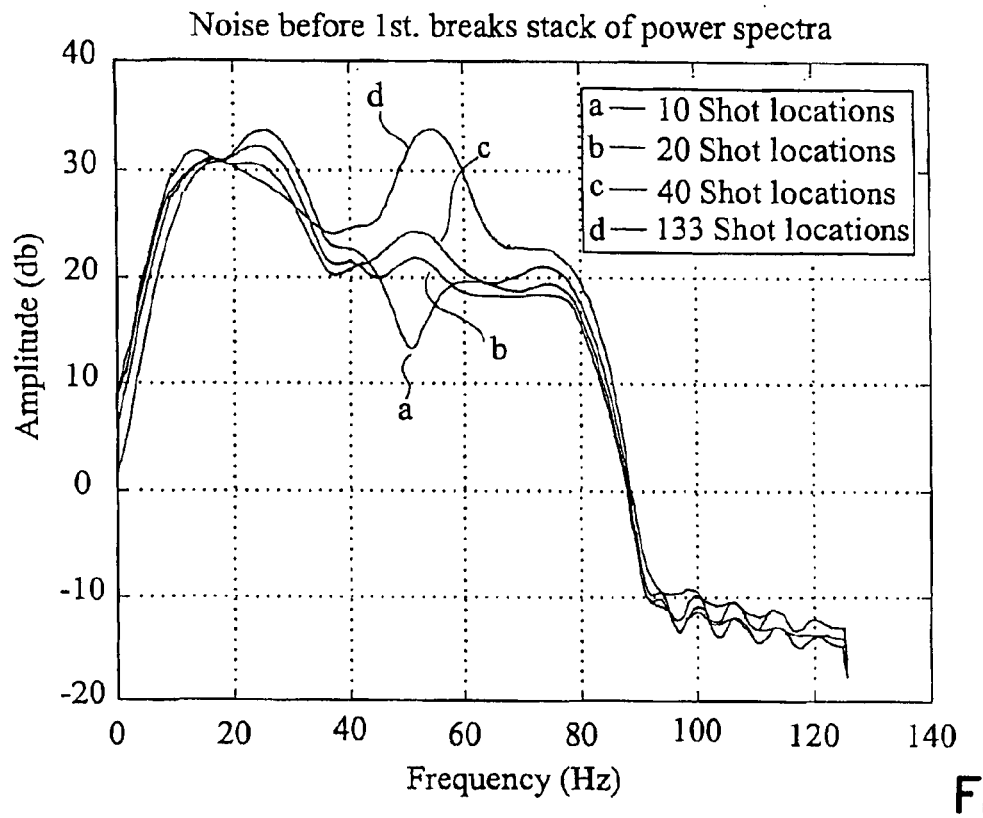
FIGS. 3(*a*) and 3(*b*) show ambient noise spectra estimated for two spatially separated geophones.
Figure 3B:
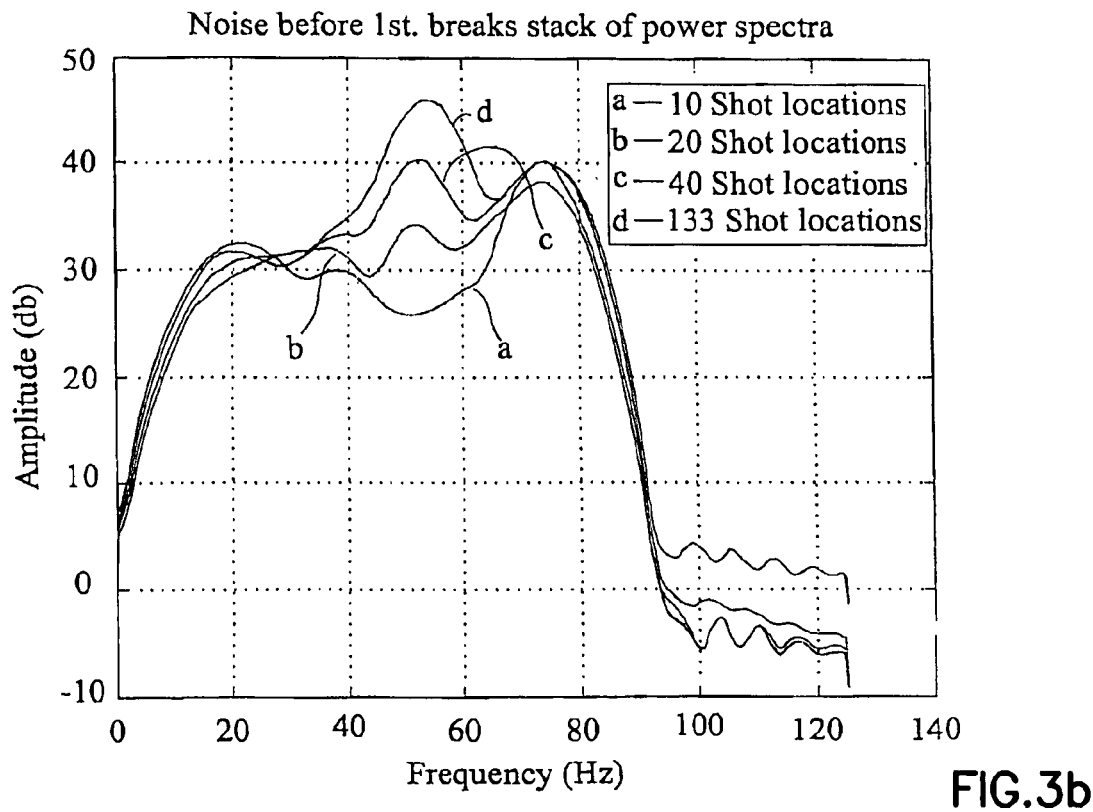

FIG. 3(a) shows estimated power spectra of the recorded ambient noise at one receiver location, and FIG. 3(b) shows estimated power spectra of the recorded ambient noise at second receiver location 17 meters from the first receiver location. Each receiver was a geophone. The spectra are parameterised by the number of traces used to obtain each spectrum. The traces, which can be regarded as sample functions of a random process, correspond to ambient noise extracted from several shot gathers by using the portions of data traces acquired before the first arrival of seismic energy from the seismic source. The data were acquired for source-receiver distances (offsets) in the range from 800 to 1000 meters. The observation time, i.e. the elapsed time from the beginning of the recording of a trace and the first arrival of seismic energy from the source, was approximately 250 ms.

It will be seen that, with the exception of frequencies near 50 Hz, the power spectra for each receiver are to a large extent independent on the number of traces, i.e. they are receiver consistent. The geophones whose power spectra are shown in FIGS. 3(a) and (b) will from now on be, for reasons that will soon be clear, respectively referred to as 'well-coupled' and 'poorly-coupled' geophones. The two geophones are respectively located in patches C and B of FIG. 5.

The notch at 50 Hz in the power spectra for both geophones probably denotes an attempt to attenuate a monochromatic source, which fails when the actual frequency drifts from the nominal one (see the peak slightly below 60 Hz). The spectral estimator used to obtain FIGS. 3(a) and 3(b) was Burg's $16^{th}$ order auto-regressive estimation, which is robust but has low resolution and is incapable of resolving frequencies only a few Hz apart. The estimator has smoothed a possible notch at 50 Hz and a peak a few Hz above 50 Hz, thereby producing a single smoothed peak. The interval between acquisition of the first trace used and acquisition of the last trace used was 1 hour.

The most important observation is the substantial higher frequency content in the frequency range 60-75 Hz in the power spectra in FIG. 3(b), which is present regardless of the number of traces analysed. This may suggest of poor coupling of the geophone used to acquire the data of FIG. 3(b).

Figure 4A:
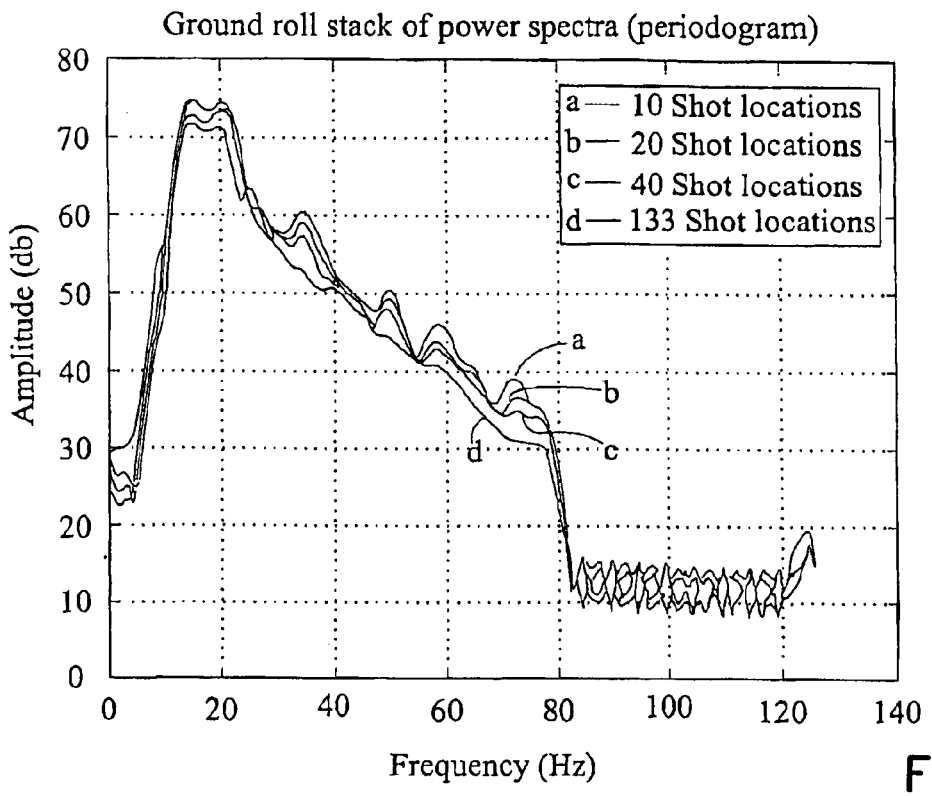
FIGS. 4(*a*) and 4(*b*) show ground roll spectra estimated for the two geophones of FIGS. 3(*a*) and 3(*b*)
Figure 4B:
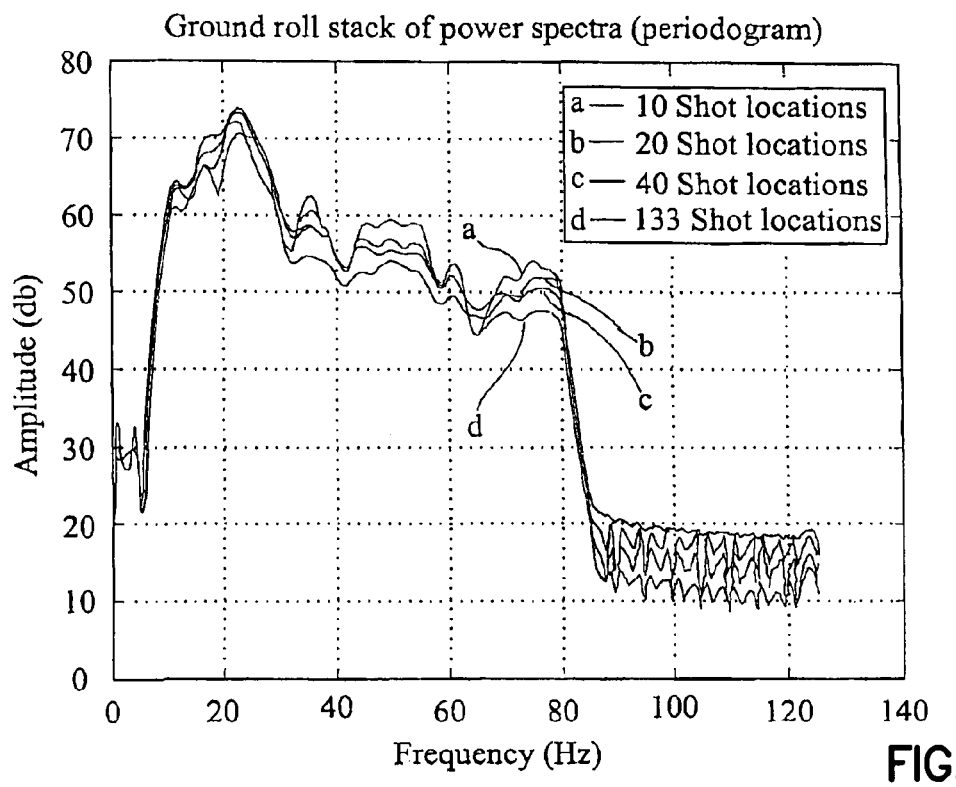

It is possible that the extra energy in the 60-75 Hz frequency range in the power spectrum of FIG. 3(b) could arise simply from ambient noise in the 60-75 Hz frequency range only present at the location of the geophone used to acquire the data of FIG. 3(b). To check whether this is the case, power spectra of the ground roll noise were determined. FIG. 4(a) shows the estimated power spectrum for the ground-roll noise recorded by the first receiver (i.e., the receiver of FIG. 3(a)), and FIG. 4(b) shows the estimated power spectrum for the ground-roll noise recorded by the second receiver (i.e., the receiver of FIG. 3(b)). It can be seen that the power spectrum of FIG. 4(b) shows the same (10-15 dB) surplus of energy in the 60-75 Hz frequency range compared to the power spectrum of FIG. 4(a). This indicates that the additional energy in the 60-75Hz range in the power spectrum of FIG. 3(b) is not due to additional ambient noise present only at the location of the second receiver, but is due to receiver coupling effects—the power spectrum of the ground-roll noise is about 40 dB stronger than the ambient noise, and the increased energy in both the noise power spectrum of FIG. 3(b) and the ground roll power spectrum of FIG. 4(b) can only be due to different transfer functions at the two receivers.

The quasi-monochromatic noise source around 50 Hz and its fluctuations detected by the ambient noise spectral analysis are overwhelmed by the ground-roll and so are not resolved in the power spectra of FIGS. 4(a) and 4(b).

Figure 5:
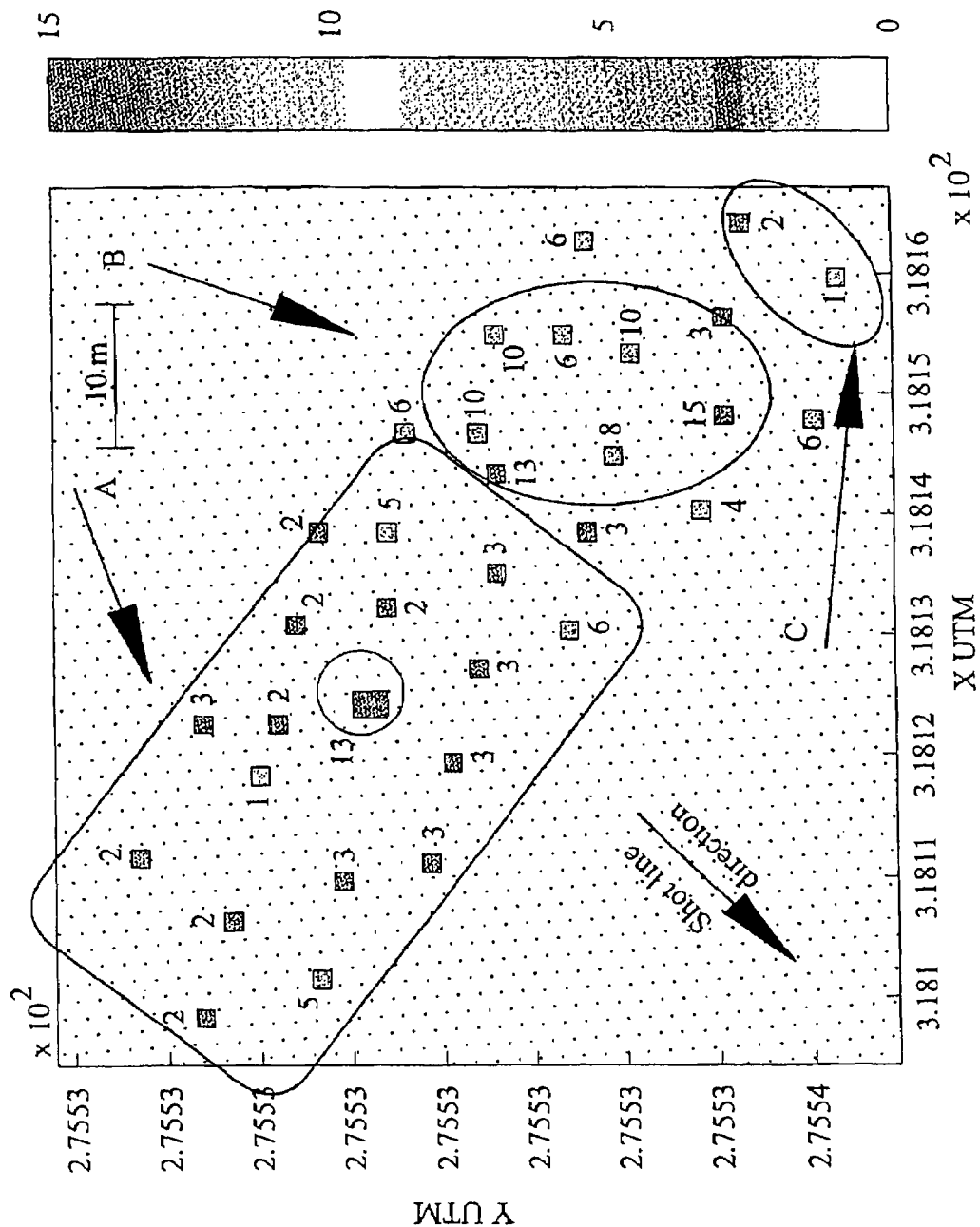
FIG. 5 shows typical coupling information obtained by a method of the invention.

FIG. 5 illustrates the result of applying a method of FIG. 2 to a group of neighboring receivers. The location of each receiver is indicated by a rectangular box. The amplitude peak of the estimated coupling transfer function for a receiver is shown adjacent to the box representing that receiver. The figure shows the amplitude peak of $GC_k$ in the seismic bandwidth, i.e. the amplitude peak of the best fitting coupling transfer function for each receiver. The coupling functions for the receivers in the circled regions A and C have peak amplitudes close to unity, denoting consistent coupling, whereas the receivers in region B have peak amplitudes up to 15, denoting poor coupling. The derivation of the coupling parameters was performed using 40 traces per receiver. It will be seen that almost all receivers in the regions A and C are well coupled, whereas the receivers in region B are not. A dead receiver in region A has been circled. The reference receiver was in region A.

Figure 6A:
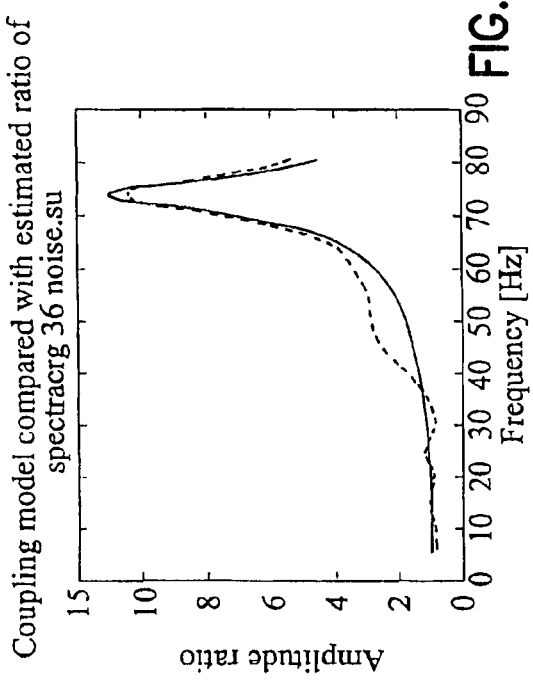
FIGS. 6(*a*) to 6(*c*) show estimated ratios of power spectra and coupling functions for selected sensors from FIG. 5.
Figure 6B:
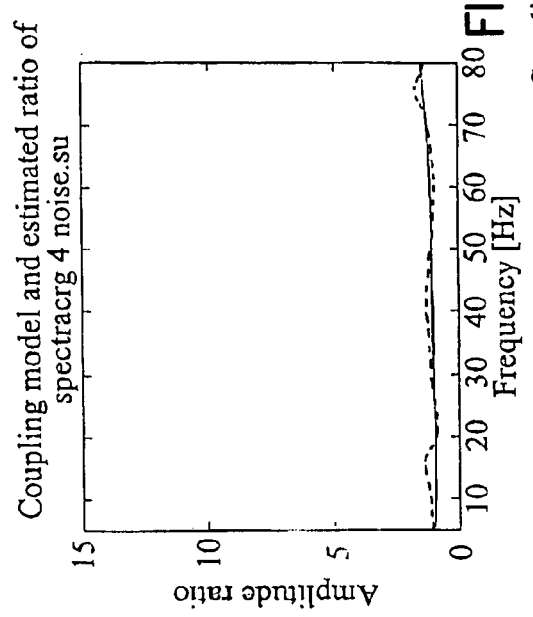
Figure 6C:
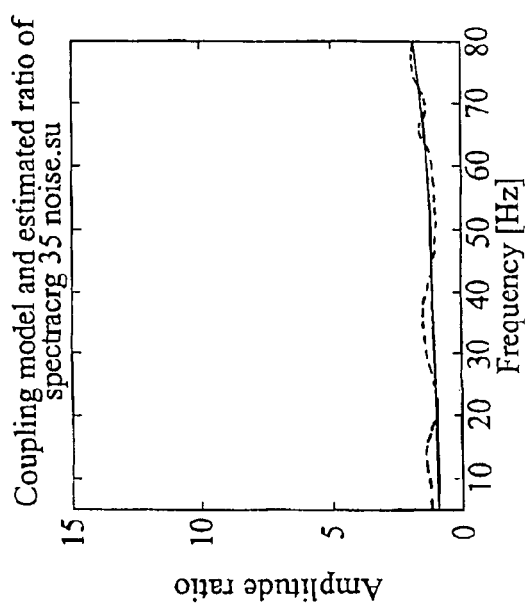

FIGS. 6(a) to 6(c) provide some additional insight on the application of this invention to obtain the results in FIG. 5. The curves shown as broken lines represent the logarithm of the ratio of the estimated power spectrum of a receiver to the estimated power spectrum of the reference receiver, as determined according to Equation (7). The curves shown in full lines represent the ratio of the best-fit two-parameter coupling function estimated for a receiver to the two-parameter coupling function for the reference receiver, as determined according to equation (2). FIGS. 6(a), 6(b) and 6(c) show the power spectrum ratio and the coupling function ratio for a receiver in, respectively, region A, region B and region C of FIG. 5. For the reference receiver which, as noted above, is in region A of FIG. 5, the coupling parameters have been set to $f_{c1}=500$ Hz, and $\eta_{c1}=1.4$ (critical damping).

It will be seen from FIGS. 6(a) and 6(c) that the ratios of power spectra for the selected receivers in region A and C to the power spectrum of the reference receiver are approximately equal to unity. The ratios of the best fitting coupling transfer function to the coupling transfer function of the reference receiver are also close to unity throughout the frequency range of 0 to 80 Hz shown in FIGS. 6(a) and 6(c)—the selected receivers in region A and C have resonance frequencies well above the seismic bandwidth, and have a high damping factor, and this indicates good coupling. FIG. 6(b) shows however that the selected receiver in region B exhibits a damped resonance phenomenon with resonance frequency slightly above 70 Hz, which is within the normal bandwidth used for seismic data acquisition. The ratio of the power spectrum of the selected receiver in region B to the power spectrum of the reference receiver reaches a peak value of approximately 11 at a frequency of just over 70 Hz. The ratio of the best-fit coupling transfer function of the selected receiver in region B to the coupling transfer function of the reference receiver also exhibits a peak at just over 70 Hz. The resonance within the seismic bandwidth is indicative of bad coupling of the selected receiver in region B.

FIG. 7(a) and FIG. 7(b) show, respectively, early arrivals of two common receiver gathers for two neighboring receivers approximately 17 meters apart. That is, all traces shown in FIG. 7(a) were acquired at one receiver (one trace for each shot), and all traces shown in FIG. 7(b) were acquired at a second receiver (again, one trace for each shot). The vertical axis represents time after actuation of the seismic source and, within a trace, the horizontal axis represents the amplitude of the vertical component of the seismic wavefield recorded by the receiver. The traces are arranged in order of increasing offset. The traces shown in FIG. 7(a) were acquired at a receiver in region C of FIG. 5, and the traces in FIG. 7(b) were acquired at a receiver in region B of FIG. 5.

The waveforms in the gathers of FIGS. 7(a) and 7(b) vary slowly trace by trace, which is evidence of good repeatability of the source signature. However, substantial differences can be seen between the gathers—the traces in FIG. 7(b) are generally more noisy than the traces of FIG. 7(a), and this is particularly evident in the portions of the traces before the first arrival of seismic energy from the source.

The traces in FIG. 7(c) have been obtained from the traces in FIG. 7(b) by estimating a coupling transfer function for the receiver according to the method of FIG. 2, obtaining a calibration filter that corrects for the estimated coupling transfer function, and applying the calibration filter to the traces of FIG. 7(b). It will be seen that the high frequencies emphasised by bad coupling in FIG. 7(b) in FIG. 7(c) have been largely removed by applying the calibration filter, and the phases of the very first arrivals are now comparable with those in FIG. 7(a). The data in FIG. 7(c) are more suitable for subsequent processing stages than those in FIG. 7(b), and in particular are more suitable for digital group forming of single sensor data which involves the combination of signals recorded by neighboring sensors.

It should however be noted that FIG. 7(c) does show signs of variations in phase approximately 20-30 ms after the first trough. This arises from near field scattering effects, which affect the phase and which may vary in the 17 meters of separation between receivers.

Figure 7:
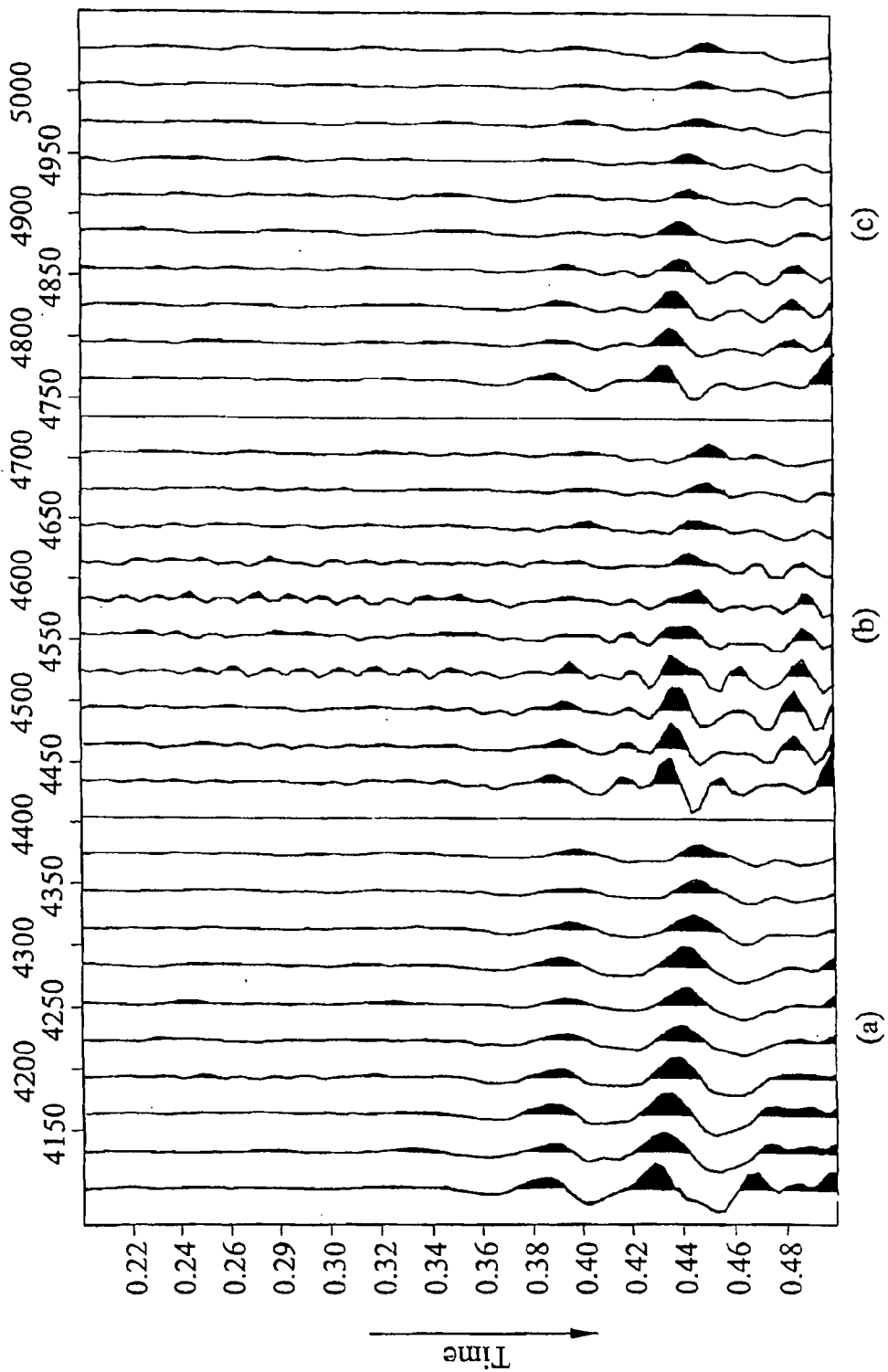
FIGS. 7(*a*) and 7(*b*) show typical traces acquired by two selected sensors from FIG. 5.

The data in the field experiment from which FIGS. 5, 6 and 7 are derived were acquired with land vibrators as seismic sources and correlated in the field with the nominal sweep. However, ambient noise records and the portion of uncorrelated data before the first arrivals may also be used in the method of this invention. Other parts of the recorded seismic signals such as reflected signals and surface waves may also be used.

Figure 8:
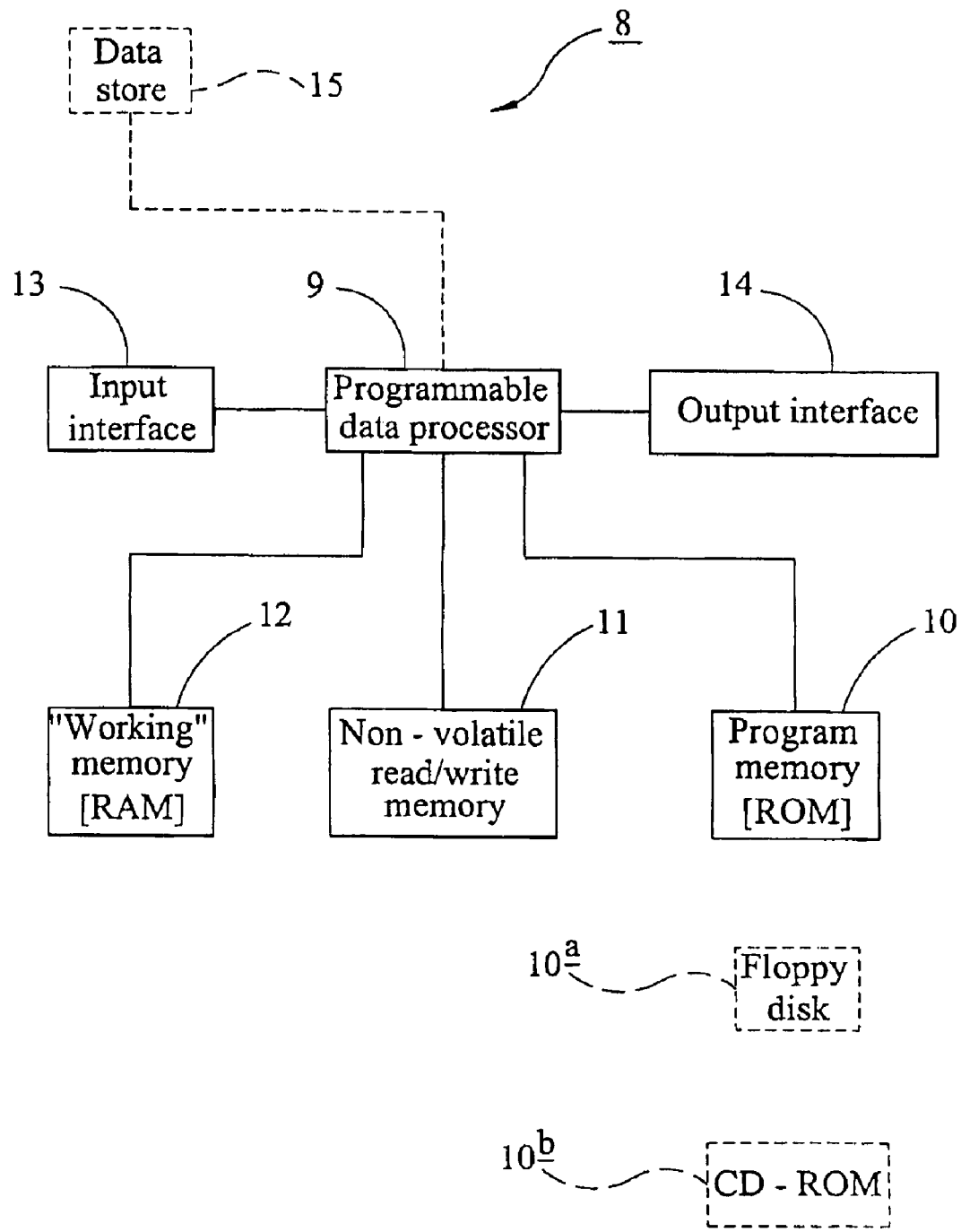
FIG. 8 shows an apparatus according to the present invention.

In the preferred embodiments described above, the method of the invention has been applied to single sensor data—that is, to data where the individual output of each receiver is available. FIG. 8 is a schematic block diagram of a programmable apparatus 8 according to the present invention. The apparatus comprises a programmable data processor 9 with a program memory 10, for instance in the form of a read-only memory (ROM), storing a program for controlling the data processor 9 to perform any of the processing methods described above. The apparatus further comprises non-volatile read/write memory 11 for storing, for example, any data which must be retained in the absence of power supply. A "working" or scratch pad memory for the data processor is provided by a random access memory (RAM) 12. An input interface 13 is provided, for instance for receiving commands and data. An output interface 14 is provided, for instance for displaying information relating to the progress and result of the method. Seismic data for processing may be supplied via the input interface 13, or may alternatively be retrieved from a machine-readable data store 15.

The program for operating the system and for performing a method as described hereinbefore is stored in the program memory 10, which may be embodied as a semi-conductor memory, for instance of the well-known ROM type. However, the program may be stored in any other suitable storage medium, such as magnetic data carrier 10a, such as a "floppy disk" or CD-ROM 10b.

What is claimed is:

1. A method of obtaining information about coupling of a seismic receiver, the method comprising: determining a power spectrum for a record acquired at a seismic receiver, obtaining information about the receiver coupling from the power spectrum, determining a coupling correction operator from the obtained coupling information, and forwarding the determined coupling correction operator to at least one of a storage means and an output interface.

2. A method as claimed in claim 1 and comprising comparing the determined power spectrum with a reference power spectrum.

3. A method as claimed in claim 2 wherein the receiver is one of a group of seismic receivers, and wherein the method comprises determining a reference power spectrum for the group of seismic receivers.

4. A method as claimed in claim 3 and comprising determining the reference power spectrum from the power spectra of selected records acquired by receivers of the group.

5. A method as claimed in claim 1 and comprising: determining a first power spectrum for a first record acquired at a first seismic receiver; determining a second power spectrum for a second record acquired at a second seismic receiver spatially separated from the first seismic receiver, the second record being acquired substantially simultaneously with the first record; and obtaining information about the coupling of one of the receivers from the first and second power spectra.

6. A method as claimed in claim 5 and comprising: identifying one of the first and second receivers as a reference receiver from the first and second power spectra.

7. A method as claimed in claim 6 and comprising obtaining information about the coupling of the other of the first and second receivers relative to the coupling of the reference receiver.

8. A method as claimed in claim 1 wherein the record is a noise record.

9. A method as claimed in claim 1 wherein the obtained coupling information comprises a resonance coupling frequency.

10. A method as claimed in claim 1 wherein the obtained coupling information comprises a coupling damping coefficient.

11. A method as claimed in claim 1 and comprising applying the coupling correction operator to seismic data acquired at the receiver.

12. A method as claimed in claim 1 wherein the or each receiver is a geophone.

13. A computer readable storage medium containing a program for controlling a programmable data processor to carry out a method as defined in claim 1.

14. A computer readable storage medium containing a program for controlling a computer to carry out a method as defined in claim 1.

15. An apparatus for obtaining information about coupling of a seismic receiver, the apparatus comprising: means for determining a power spectrum for a record acquired at a seismic receiver; means for obtaining information about the receiver coupling from the power spectrum, means for determining a coupling correction operator from the obtained coupling information; and at least one of storage means and an output interface.

16. An apparatus as claimed in claim 15 and comprising a programmable data processor.

* * * * *